United States Patent Office
3,252,162
Patented May 17, 1966

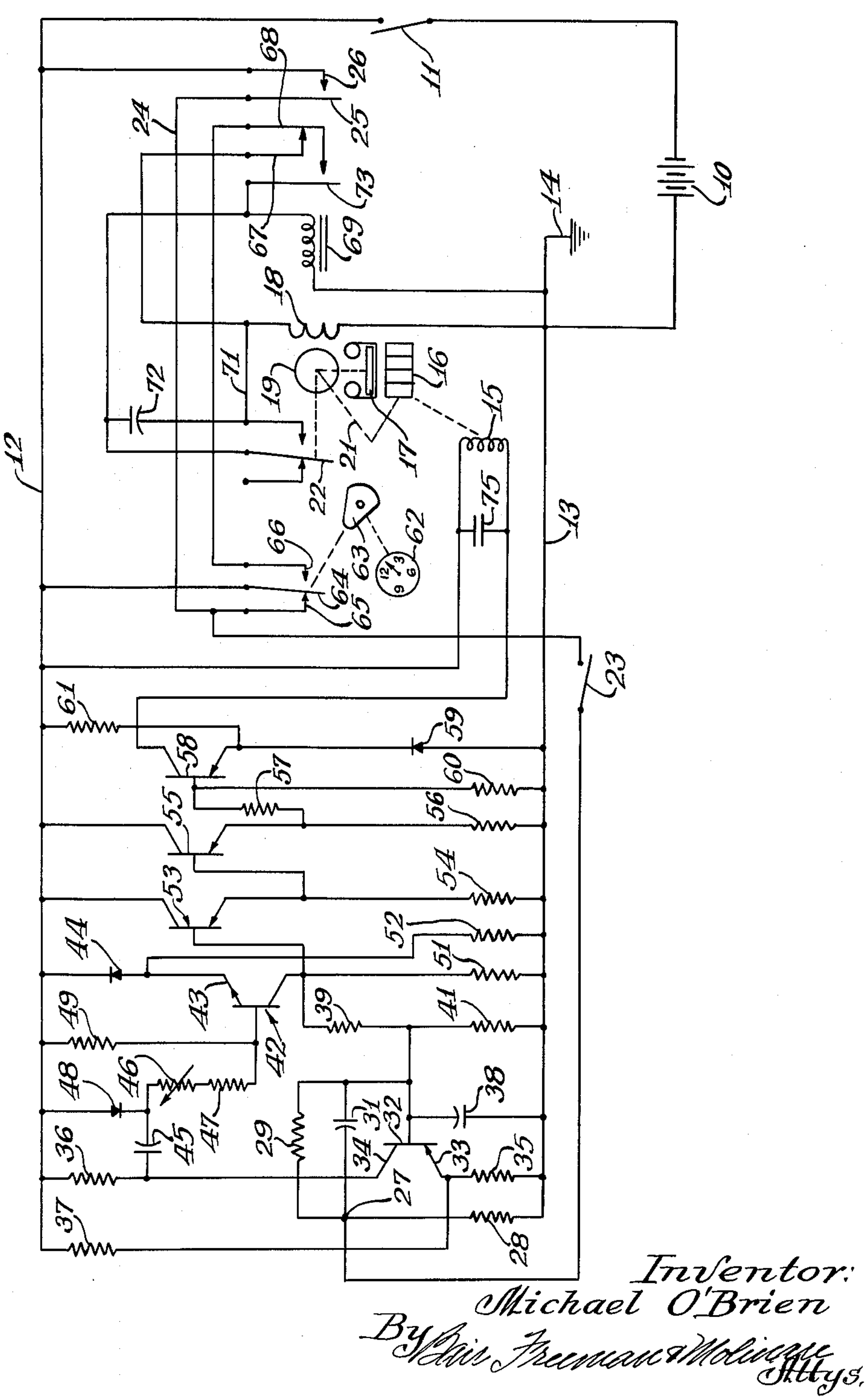
Inventor:
Michael O'Brien
By Hair, Freeman & Molinare
Attys.

3,252,162

ELECTRICAL PULSE COUNTER

Michael O'Brien, Grayslake, Ill., assignor to Mangood Corporation, a corporation of Illinois Filed Feb. 17, 1964, Ser. No. 345,253
6 Claims. (Cl. 346—40)

This invention relates to electrical pulse counters and more particularly to apparatus for counting relatively short electrical pulses such as those produced by traffic counters and similar mechanical counters.

For counting traffic it is necessary to have a self-contained and self-powered unit which can be placed in a desired location adjacent to roads and which will function over a long period of time with no attention. For accuracy, it is necessary that the counter be capable of actuation by short pulses on the order of 500 microseconds and be able to discriminate between such pulses and other short pulses or electrical noise.

It is accordingly a principal object of the present invention to provide an electrical pulse counter which satisfies all of these requirements and which uses transistors in the counting circuit so that it can be powered by a 6-volt battery to function over a long period of time.

Another object is to provide an electrical pulse counter in which pulses produced by closing of an electrically or pneumatically operated switch, or the like, are utilized to trigger a gate transistor which in turn triggers a holding transistor through which an isolating transistor is triggered. The output of the isolating transistor is amplified by a driver transistor to turn on a power transistor which supplies operating power pulses to a counting relay, or similar electrical counting mechanism.

According to a feature of the invention, the incoming pulses to the gate transistor are filtered by a capacitor to eliminate sharp pulses which might produce a false count. The gate transistor is coupled to the holding transistor through a capacitor and resistor circuit by means of which any desired time constant through a wide range can be obtained.

A further object is to provide an electrical pulse counter in which the count is recorded by a printing mechanism which cuts off the counter circuit during printing.

According to a feature of the invention the counter circuit is re-energized as soon as the actual printing is accomplished and even before the printing control switch reopens to minimize the interval during which the counting circuit is incapacitated.

The above and other objects and features of the invention will be more readily apparent from the following description when read in connection with the accompanying drawing, in which:

The single figure is a circuit diagram of an electrical pulse counter embodying the invention.

As shown, the circuit is powered by a conventional 6-volt battery, indicated at 10, such as a wet type storage battery, dry cells, or the like. One side of the battery is connected through an on-off control switch 11 to a main line 12 serving as one side of the power circuit for the entire mechanism. The other side of the battery is connected to a similar line 13 serving as the other side of the power circuit and which may be grounded, as desired, as indicated at 14.

The actual counting is performed by a coil 15 which is periodically energized by short electrical pulses to advance a conventional counter 16 through one step each time it is energized. A printing mechanism, indicated at 17, cooperates with the counter periodically to print a record of the indicated count shown by the counter. The printing mechanism is operated by an electric motor having a winding 18 and a rotor 19 which is connected to the printing mechanism to actuate it. The motor is also mechanically connected to the counter 16, as indicated by the dotted line 21, to reset the counter after each printing operation and is connected to a switch 22 whose purpose will appear more fully hereinafter.

Electrical pulses to be counted are produced by momentary closing of counting switch 23 such, for example, as the usual tube extending across a roadway for traffic counting or a similar switch closing momentarily by the operation of machines of various types to produce short electrical pulses. These pulses may be on the order of 500 microseconds to 80 milliseconds and are to be counted with a high degree of accuracy. As shown, one side of the switch 23 is connected through a line 24 to the movable contact 25 of a normally open switch, including a fiexd contact 26. The contact 26 is connected through the switch 11 to one side of the battery 10.

The other side of the switch 23 is connected to a terminal point 27 which is in turn connected through a resistor 28 to the line 13. The terminal 27 is also connected through a resistor 29 and capacitor 31 in parallel to the base 32 of a first transistor. The transistor includes an emitter 33 and a collector 34. The emitter is connected to the line 13 through a swamping resistor 35. The collector 34 is connected through a resistor 36 to the line 12 and the line 12 is also connected through a resistor 37 to the emitter 33. The base 32 is connected to the line 13 through a capacitor 38 and is also connected to the midpoint between a pair of resistors 39 and 41.

The first transistor which functions as a gate transistor triggers a holding transistor indicated generally at 42 and which has its emitter electrode 43 connected through a rectifier 44 to the line 12. A point between the collector electrode 34 of the gate transistor and the resistor 36 is connected through a capacitor 45 and a variable resistor 46 and fixed resistor 47 to the base of the holding transistor 42. A rectifier 48 connects the line 12 to a point between capacitor 45 and resistor 46 and a resistor 49 also connects the base of the transistor 42 to the line 12. The capacitor 45 and resistors 46 and 47 form a time delay unit by which the charging rate of the capacitor 45 can be adjusted for any time constant from approximately .5 to 80 milliseconds.

The collector of the holding transistor 42 is connected through resistors 39 and 41 to the line 13 and also through a resistor 51 directly to the line 13. The emitter 43 is connected through a resistor 52 to the line 13, as shown.

The collector of the holding transistor 42 is connected to the base of an isolating transistor 53 whose collector is connected directly to the line 12 and whose emitter is connected through a resistor 54 to the line 13.

A point between the emitter of the isolating transistor and the resistor 54 is connected to the base of a driver transistor 55. The collector of this transistor is connected directly to the line 12 and the emitter is connected to the line 13 through a resistor 56. A point between the emitter of the driver transistor and the resistor 56 is connected through resistor 57 to the base of a power transistor 58. The emitter of this transistor is connected to the line 13 through a rectifier 59 and to the line 12 through a resistor 61. The collector of the driver transistor is connected to one side of the counter coil 15 with the other side thereof being connected directly to the line 13. A record of the count is preferably printed periodically under control of a clock mechanism, as indicated generally at 62, and which can be adjusted to print out a record of the count at any desired interval. To initiate a count the clock mechanism drives a cam 63 which operates the movable contact 64 of a two-position switch including fixed contacts 65 and 66. A circuit is normally completed from the line 12 through the switch contacts 64 and 65 to the switch 23. This circuit is interrupted momentarily whenever a print is initiated.

When it is desired to print the cam 63 completes a circuit between the contacts 64 and 66 from which a circuit is completed through switch contacts 67 and 68 to the motor winding 18 to energize the motor. As soon as the motor is energized it will initiate a printing operation and will simultaneously operate the switch 22 to complete a circuit through a relay coil 69. This circuit can be traced from line 12 through switch contacts 64 and 66, switch contacts 67 and 68 through a line 71 to the switch 22 and from the switch 22 through a relay coil 69 to line 13. Preferably a capacitor 72 is connected across the contacts of the switch 22 to prevent arcing when the contacts open.

The relay coil 69 when energized will close the switch contacts 25 and 26 and will move contact 68 into contact with a switch contact 73. This completes a holding circuit through a relay coil 69 from line 12 through contacts 64 and 66 and through contacts 68 and 73 to the coil 69. Closing of the contacts 68 and 73 also completes a holding circuit for maintaining the motor winding 18 energized through the closed switch 22 and the line 71. The motor is constructed to turn through one complete revolution to complete a printing operation and to stop in its initial position at the end of the printing operation.

Opening of the circuit between the switch contacts 64 and 65 will interrupt the pulse circuit so that the counter will not be advanced during the actual printing operation. The operation of switch 22 is timed so that this switch will not close until after the actual printing has been completed, but before the motor 19 has completed a revolution. As soon as the switch 22 is closed the relay 69 will close the contacts 25 and 26 to re-establish the counting circuit through the line 24 and switch 23 so that counting can be resumed without waiting for the motor to complete a cycle.

Each time the switch 23 is closed with the circuit in the condition illustrated, that is a non-printing condition, a pulse will be supplied to the base 32 of the first transistor to make it conductive. This transistor is normally biased to a non-conductive condition through its base resistor 41 and its emitter swamping resistors 35 and 37. The first transistor is therefore non-conducting until it receives a pulse due to the closing of the switch 23 to drive it into conducting condition. Closing of the switch provides a negative pulse to the junction of resistors 28, 29 and capacitor 31 which network provides a voltage divider and provides the base of the first transistor with a sufficient voltage to trigger it.

The capacitor 38 serves to filter out all sharp pulses from the base to make sure that the transistor will not be turned on by any undesired noises or sharp electrical transients.

When the first transistor becomes conductive it will produce a positive voltage across the resistor 36. The capacitor 45 begins to charge up to this voltage sending a pulse through resistors 46 and 47 to the base of transistor 42. By adjusting the variable resistor 46, the rate of charging of the capacitor 45 can be adjusted for any time constant, depending upon the frequency and duration of the pulse to be measured.

The transistor 42 is normally maintained in a non-conducting condition through the base resistor 49 and its emitter rectifier 44 and resistor 52. The resistor 49 also acts as a voltage divider to insure that the transistor 42 will receive the necessary triggering voltage to make is conductive. Transistor 42 becomes conductive and remains conductive during the complete charging cycle of the capacitor 45.

When the transistor 42 is conducting it will generate a negative voltage across its collector resistor 51 which is transmitted through the resistor 39 to the base of the first transistor. This connection will insure that the first transistor remains conductive until the capacitor 45 is fully charged to maintain the transistor 42 conductive.

The transistor 53 is normally maintained in a non-conductive condition through the resistor 51 and its emitter load and swamp resistor 54. When transistor 42 is conducting it will produce a negative voltage across the resistor 51, as pointed out above, which will be supplied to the base of transistor 53 to trigger it into conduction. When the transistor 53 becomes conductive, it will cause a negative voltage to be generated across its emitter resistor 54.

The transistor 55 is normally maintained in non-conducting condition through the resistor 54 and through its emitter load resistor 56. When the transistor 53 is conducting and is producing a negative voltage across the resistor 54 this voltage will be transmitted to the base of the transistor 55 to trigger it into condition.

The transistor 58 is normally maintained in non-conductive condition through a base resistor 60 thereon and through its emitter rectifier 59 and resistor 61. When the transistor 55 is conducting and is producing a negative voltage across the resistor 56 this voltage will be transmitted to the base of transistor 58 through the resistor 57. When the transistor 58 becomes conductive it will transmit a pulse through the counter coil 15 to operate the counter.

When the time constant of the capacitor 45 and resistors 46 and 47 is reached the transistor 42 will be switched off and the negative voltage produced across the resistor 51 and which is transmitted to the base of the first transistor will be removed so that the first transistor will also be switched off. Thereafter, the transistors 53, 55 and 58 will be switched off in order to de-energize the coil 15. The on time of the transistors is adjustable by adjustment of the resistor 46 so that the time energizing requirements of the counter coil can be satisfied. Preferably a capacitor 75 is connected across the coil 15 shown to protect the transistor 58 from high voltage transients during de-energizing of the coil.

It has been found that with a circuit, as shown, a power gain of approximately 22 d.b. can be produced from a 6-volt battery which provides adequate power for operating the counter relay. A switching speed of approximately .6 millisecond from the contact closure to the time voltage is applied to the counter coil is also achieved. Testing of a unit constructed according to the invention on a three lane expressway with traffic rated 5,000 vehicles per hour at approximate speeds of 70 m.p.h. proved accurate to approximately 98%.

While one embodiment of the invention has been shown and described herein, it will be understood that it is illustrative only and not to be taken as a definition of the scope of the invention, reference being had for this purpose to the appended claims.

What is claimed is:

1. An electrical pulse counter comprising a gate transistor, means to apply short duration electric pulses to be counted to the gate transistor to make it conductive, a holding transistor connected to the gate transistor and made conductive thereby when the gate transistor is conductive, an isolating transistor connected to the holding transistor and made conductive thereby when the holding transistor is conductive, counting means, and means energized by the isolating transistor when it is conductive to operate the counting means.

2. The pulse counter of claim 1 including a filter capacitor connected to the base of the gate transistor to filter out transients of short duration thereby to prevent accidental triggering of the gate transistor.

3. The pulse counter of claim 1 including a load resistor in series with the gate transistor, and a capacitor and resistor in series connecting a point between the load resistor and gate transistor to the base of the holding transistor to control the holding transistor.

4. The pulse counter of claim 1 in which the counting means comprises a printing wheel advanced by energization of the isolating transistor, and print means for periodically opening the circuit to the pulse applying means and printing the number of pulses indicated by the wheel.

5. The pulse counter of claim 1 in which the counting means comprises a printing wheel advanced by energization of the isolating transistor, a print motor operating when energized to print a record of the valve shown by the printing wheel, a switch operable to open the circuit to the pulse applying means and to energize the print motor, a relay, a switch operated by the print motor to energize the relay when the first named switch is operated, and switches operated by the relay to maintain it energized and to re-energize the pulse circuit.

6. An electrical pulse counter comprising a gate transistor, means to apply short duration electric pulses to be counted to the gate transistor to make it conductive, a holding transistor connected to the gate transistor and made conductive thereby when the gate transistor is conductive, an isolating transistor connected to the holding transistor and made conductive thereby when the holding transistor is conductive, a driver transistor connected to the isolating transistor to be made conductive thereby when the isolating transistor is conductive, a power transistor connected to the driver transistor to be made conductive thereby when the driver transistor is conductive, and a counter operating coil connected to the power transistor to be energized thereby.

References Cited by the Examiner

UNITED STATES PATENTS

| | | | |
|---|---|---|---|
| 2,419,099 | 4/1947 | Wall | 346—33 |
| 3,005,114 | 10/1961 | Martin et al. | 307—88.5 |
| 3,027,497 | 3/1962 | Carlson et al. | 317—148.5 X |

LEO SMILOW, *Primary Examiner.*